(12) United States Patent
Blatter et al.

(10) Patent No.: US 6,470,688 B2
(45) Date of Patent: Oct. 29, 2002

(54) APPARATUS FOR THE RAPID STARTUP AND RAPID INCREASE IN OUTPUT OF A GAS TURBINE PLANT

(75) Inventors: Richard Blatter, Ennetbaden (CH); Erhard Liebig, Laufenburg (DE)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/984,201

(22) Filed: Oct. 29, 2001

(65) Prior Publication Data

US 2002/0023425 A1 Feb. 28, 2002

Related U.S. Application Data

(62) Division of application No. 09/482,081, filed on Jan. 13, 2000, now Pat. No. 6,378,285.

(30) Foreign Application Priority Data

Jan. 22, 1999 (DE) .......................... 199 02 437

(51) Int. Cl.$^7$ ................ F02C 3/36; F02C 7/26
(52) U.S. Cl. ................ 60/790; 60/39.182; 60/39.3
(58) Field of Search ................ 60/39.141, 39.27, 60/39.281, 39.3, 395.5, 39.182, 786, 790

(56) References Cited

U.S. PATENT DOCUMENTS

| 3,021,673 A | 2/1962 | Mock | ................ 60/39.55 |
|---|---|---|---|
| 3,238,719 A | 3/1966 | Harslem | ................ 60/39.55 |
| 3,943,372 A | 3/1976 | Smith et al. | ............. 60/39.281 |
| 4,134,258 A | 1/1979 | Hobo et al. | |
| 4,899,537 A | 2/1990 | Cheng | |
| 5,498,133 A | 3/1996 | Lee | |
| 5,634,766 A | 6/1997 | Cunha et al. | |
| 6,033,181 A | 3/2000 | Endres et al. | |

FOREIGN PATENT DOCUMENTS

| DE | 3830804 C2 | 5/1992 |
|---|---|---|
| DE | 19615911 A1 | 10/1997 |
| EP | 0848149 A2 | 6/1998 |
| JP | 0600090927 | 5/1985 |
| JP | 0020157427 | 6/1990 |
| JP | 0060264772 | 9/1994 |
| JP | 0090021328 | 1/1997 |

Primary Examiner—Louis J. Casaregola
(74) Attorney, Agent, or Firm—Burns, Doane, Swecker & Mathis, L.L.P.

(57) ABSTRACT

The startup time or the output gradient of a gas turbine plant during startup are limited by the maximum permissible temperature gradient. The increase in the fuel mass flow supplied, if appropriate in combination with the combustion-air mass flow supplied, is consequently also limited. In order to accelerate the startup and to increase the output gradient during startup, then, an additional working medium, for example water or steam, increasing the mass flow flowing through the turbine is supplied at the same time as the fuel mass flow and/or combustion-air mass flow. The output gradient is therefore increased with the maximum permissible temperature gradient remaining the same, so that a required output is reached more rapidly.

5 Claims, 2 Drawing Sheets

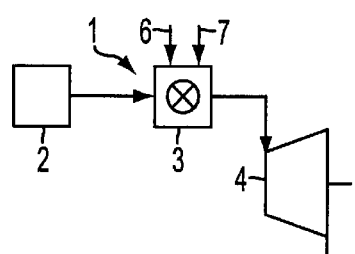
FIG. 4
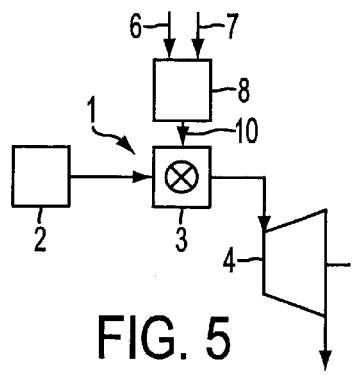
FIG. 5
FIG. 6
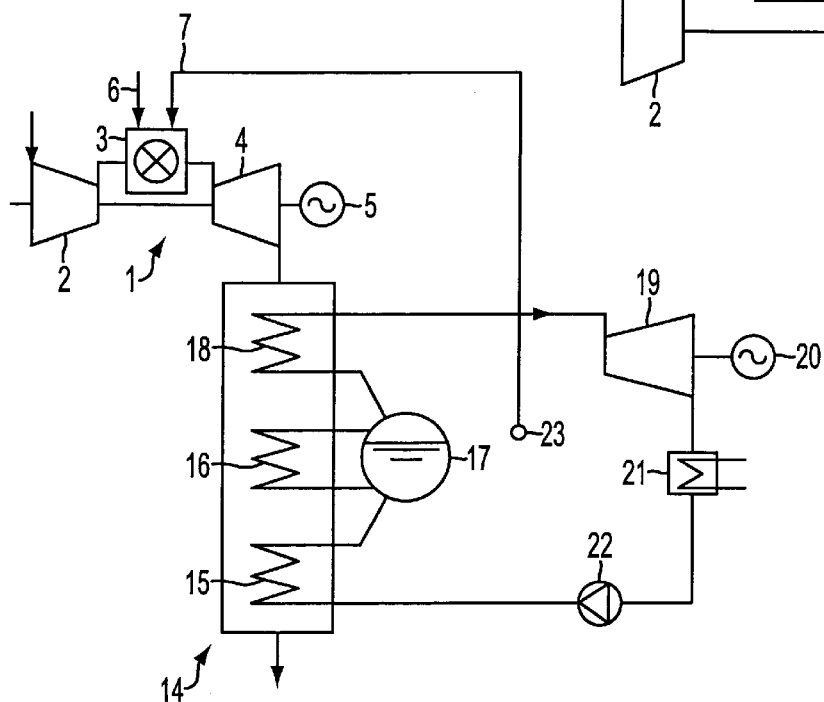
FIG. 7

APPARATUS FOR THE RAPID STARTUP AND RAPID INCREASE IN OUTPUT OF A GAS TURBINE PLANT

This application is a divisional of application Ser. No. 09/482,081, filed on Jan. 13, 2000 U.S. Pat. No. 6,378,285.

FIELD OF THE INVENTION

The invention relates to a method for the rapid startup and rapid increase in output of a gas turbine plant which has at least one compressed-air source, a combustion chamber and a turbine. It further relates to an apparatus for carrying out the method, to a gas turbine plant having a generator and to a combined-cycle power station with such an apparatus.

BACKGROUND OF THE INVENTION

When an increased power demand occurs in an electrical network into which power from various power stations is fed, the output of the available power stations must be increased. The same requirements arise as a result of an unplanned failure on the generator side, but are also conceivable in the case of network faults and the like.

It is obvious that the increase in output of the power stations or their generator units should be possible with as high an output gradient as possible, inter alia for the sake of maintaining the prescribed frequency band of the electrical network.

Such an increase in output may become necessary in any operating state of a respective energy generator, for example when the latter is under part load or full load.

The term "full load" is identical, in this context, to the terms "rated output" or "maximum continuous output", that is to say an upper output in terms of which the plant is designed for continuous operation. By "part load" is meant, here, an output below the maximum continuous output, and by "overload" is meant an output above the maximum continuous output. The term "maximum output" is used hereafter for the maximum operative output limited in time.

Increases in output are critical, in particular, during network-side peak load times, during which the respective energy generators are already being operated at their maximum continuous output (rated output), and, at the same time, an unplanned event occurs which requires a brief increase in output above the maximum continuous output.

The expression "primary response" is known in this respect, and this relates to an increase in output above the appointed or currently operated actual output of a respective energy generator having a defined output gradient. For example, the increase in output from the actual output to an about 10% higher output required is to take place within 10 seconds.

The holding of an additional output above an actual output is defined by "secondary response", that is to say, for example, operating with an additional output of, for example, 8% for a period of time of, for example, 30 minutes.

As regards the "primary response" and "secondary response", therefore, it is useful to know the maximum operable output gradient, the amount of the additional output as a function of the currently operated actual output and the maximum duration for operating the additional output. It should be possible to furnish an additional output from any load point, with the exception of the maximum output.

This means, in general terms, that power stations must have reserves in any form which make it possible, on the one hand, to achieve a rapid increase in output (primary response) and, on the other hand, to hold an additional output for a limited time (secondary response).

Irrespective of the possibilities for increasing the output, where "primary response" requirements are concerned, it is important by suitable means to have the capability of operating as high an output gradient as possible above the maximum continuous output.

So as to have a reserve available for the rapid increase in output, it is known, for example, to operate steam turbines in a steam power station in a throttled-back mode. However, this constantly entails losses (a reduction in the overall efficiency of the power station) and increased wear.

Another known possibility for the rapid provision of additional output in a conventional power station is to cut off regenerative preheaters or to uncouple them from other steam consumers.

Power stations with a constant hot reserve, that is to say energy generators which are constantly in the startup state, are also known. This, again, signifies a permanent employment of fuel, personnel and the like.

Quick-starting plants, for example diesel engines with a generator, in order, for example in accident situations, to ensure a minimal amount of work in operating and regulating a power station, are also known.

Furthermore, hydroelectric power stations and, in particular, pumped storage power stations may also be used as a power reserve, the latter being intended, in particular, for ensuring daytime balancing.

With the exception of gas turbine plants, only the possibilities for throttling back or opening the inlet valves on steam turbines and the possibility of cutting off extractions of steam from steam turbines are suitable for a rapid increase in output along the lines of a "primary response". The relevant reserves are therefore exclusively corotating reserves (spinning reserves) at rated speed with an existing electrical connection to the network. Plants which first have to be started or run up to speed and are to be synchronized are unsuitable for making contributions to cover in the "primary response" area.

In other plants, the possible temporary extra power load is too small by virtue of the system or, as in the case of pumped storage power stations, use depends, for "primary response" purposes, on the instantaneous operating state, but also on the hydrological situation.

Moreover, keeping power in hand as a hot or cold reserve ties up capital. Throttling, part-load modes, heat-retaining operation and the like have an adverse influence on plant profitability.

As already mentioned, one exception is gas turbine plants which, because of their good dynamic behavior, are already being used today for "primary response" purposes.

In this case, there are basically two possibilities for increasing the output of a gas turbine plant:
1. Increasing the upper process temperature (gas turbine inlet temperature);
2. Increasing the mass flow through the gas turbine.

Increasing the process temperature by an increase in the fueling capacity, that is to say the fuel mass flow, as a means for increasing the output comes up against limits of thermal material and system stress in the form of a maximum permissible temperature. The maximum permissible output gradient during an increase in output comes up against limits of thermal material and system stress in the form of a maximum permissible temperature gradient.

An increase in output by increasing the mass flow through the gas turbine plant may be carried out, apart from the possibilities of regulating the air mass flow in conjunction with the possibilities of regulating the fuel mass flow, by the injection of water, steam or a water/steam mixture.

If, in the case of water or steam injection, the currently operated process temperature cannot be maintained at the gas turbine inlet by a simultaneous increase in the fueling capacity, the increase in output may be accompanied by a loss of efficiency. In an extreme situation, the gas turbine output itself may also decline. To what extent the water or steam injection influences the efficiency of the gas turbine process and the power output depends on the fueling capacity possibilities, on the state of the additional working medium (water or steam) and its temperature, but also on the design features of the gas turbine plant itself.

Water or steam injection involves a relatively cold additional mass-flow which, in the case of water, has to be additionally evaporated in the gas turbine plant.

Gas turbine plants are used nowadays for "primary response" purposes or as peak load plants as follows:

1. By increasing the fueling capacity, if appropriate in conjunction with adjustments of the guide vanes on the compressor in order to increase the air mass flow, the gas turbine plant is run up to the maximum permissible temperature or to the maximum continuous output according to the permissible temperature gradient or output gradient.

2. In a second step, additional power is generated, at most until the maximum output is reached, by water or steam injection in conjunction with an increase in the fueling capacity, with the maximum permissible temperature being maintained.

In view of the conditions for opening up electrical power markets, there is a constant stream of new requirements placed on generating plants, particularly with regard to output flexibility. In gas turbine plants, too, there is therefore the task of seeking new solutions for increasing the maximum operable output gradient in terms of the "primary response".

SUMMARY OF THE INVENTION

The object of the invention is to provide a method and an apparatus for the more rapid startup and more rapid increase in output of a gas turbine plant, so that as high an output gradient as possible can be operated, without the maximum permissible positive temperature gradient or other maximum permissible mechanical or thermal material stresses being exceeded.

The method according to the invention is characterized in that the fuel mass flow supplied to the combustion chamber and/or the combustion-air mass flow supplied is/are increased and, at the same time, an additional working medium increasing the mass flow flowing through the turbine is supplied.

An increase in the fuel supply alone in order to increase the output leads to an increase in the temperature, in particular in the combustion chamber and in the turbine which, as is known, is restricted in terms of its height and gradient due to the thermal material and system stress.

Only injecting water or steam leads to a drop in the temperature of the components located downstream of the injection point in the direction of flow. Apart from output and efficiency effects which are not positive in all cases, negative temperature gradients also place limits on the injection of an additional working medium of this kind.

The method according to the invention is based on the idea, irrespective of the load state of the gas turbine plant, of employing in combination both operating modes working in opposition in terms of thermal load, in order
- to have the capability of operating higher output gradients, along with the same thermal load, or
- to lower the thermal load, along with the same output gradients.

By means of this combination, under the same conditions of temperature and output of the gas turbine plant, the fueling capacity and therefore also the mechanical power output can be increased or reduced more rapidly or in a way which takes greater care of the plant.

The actual location of water or steam injection is unimportant for the concept of the invention. There are possibilities for injecting into the region between the compressor outlet and combustion chamber, into the combustion chamber, particularly via the burners themselves, and downstream of the combustion chamber, either directly into the gas mass flow or indirectly via the guide vanes or moving blades, if appropriate also as a mixture with additional cooling air. Advantageously, water or steam injection should take place at a point having no influence on combustion or on flame stability. In general terms, therefore, only the supply of an additional working medium to the gas turbine plant or from the injection point is referred to hereafter.

An apparatus for carrying out the method is distinguished by a compressed-air source, a combustion chamber and a turbine, by a fuel line for supplying a fuel to the combustion chamber and by a working medium line for supplying the additional working medium to the injection point, and by a regulator for controlling the respective mass flow through the fuel line and the working medium line, said regulator storing the value of the maximum permissible positive temperature gradient of the gas turbine plant and controlling the respective mass flow through the fuel line and the working medium line in such a way that the value of the maximum permissible positive temperature gradient of the gas turbine plant is not exceeded.

A combined-cycle power station having a gas turbine plant with a generator and a regulator for controlling the mass flow of the fuel and of the additional working medium in order to limit the positive temperature gradient and the stress on components of the gas turbine plant contains a heat recovery steam generator heated by the waste gas from the gas turbine and a steam turbo set, the additional working medium being cold water, warm water, hot water, saturated water, wet steam, saturated steam or superheated steam branched off from the water/steam circuit of the combined-cycle power station.

BRIEF DESCRIPTION OF THE DRAWINGS

The method according to the invention is illustrated hereafter by means of simplified graphs and the apparatus according to the invention by means of basic diagrams.

FIG. 4 shows a gas turbine plant with a separate supply of fuel and additional working medium;

FIG. 5 shows a gas turbine plant with the supply of a mixture of fuel and additional working medium;

FIG. 6 shows a gas turbine plant with a regulator for controlling the mass flows supplied to the gas turbine plant, and FIG. 7 shows, in simplified form, a combined-cycle power station with a heat recovery steam generator.

DESCRIPTION OF THE PREFERRED EMBODIMENTS

First of all, it is to be laid down, in general terms, that fuel is intended to mean gas or oil, and, if appropriate, the fuel may be preheated and provided with additives. The additional working medium may be cold water, warm water, saturated water, wet steam, saturated steam or superheated steam. This additional working medium may originate from an overall system containing the gas turbine plant or from an external source, for example a hot-water network or a steam network. If the gas turbine plant is possibly assigned a heat recovery steam generator for of a combined-cycle power station, the additional working medium may be extracted from the heat recovery steam generator or the water/steam circuit at any expedient point.

The additional working medium must, at all events, be conditioned in such a way that it conforms to the conditions of the gas turbine plant.

Figure 1:
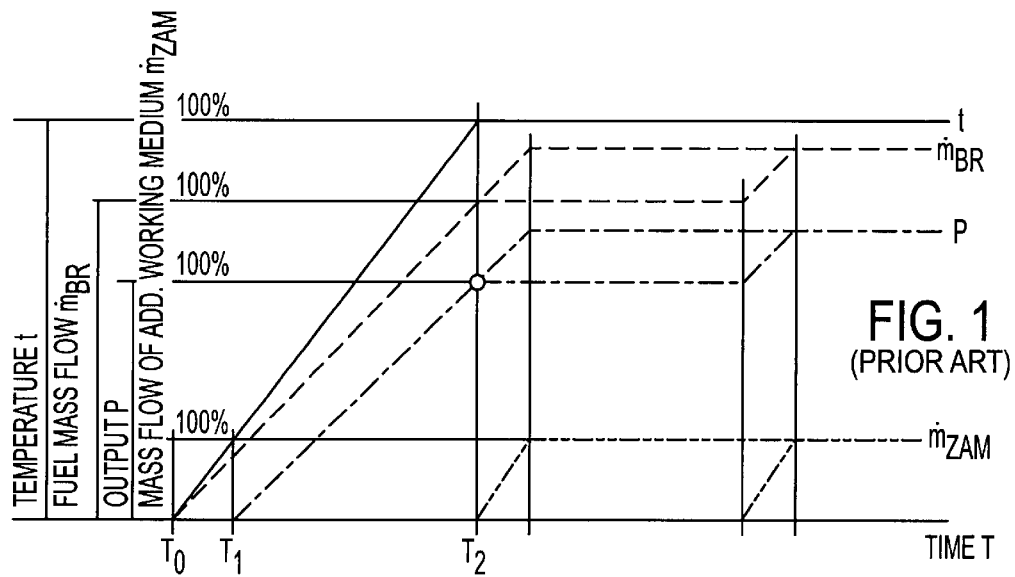
FIG. 1 is a graph which, in simplified form, shows, for basic explanatory purposes, the profile of the parameters of a gas turbine plant which are essential to the concept of the invention, during startup.
Figure 2:
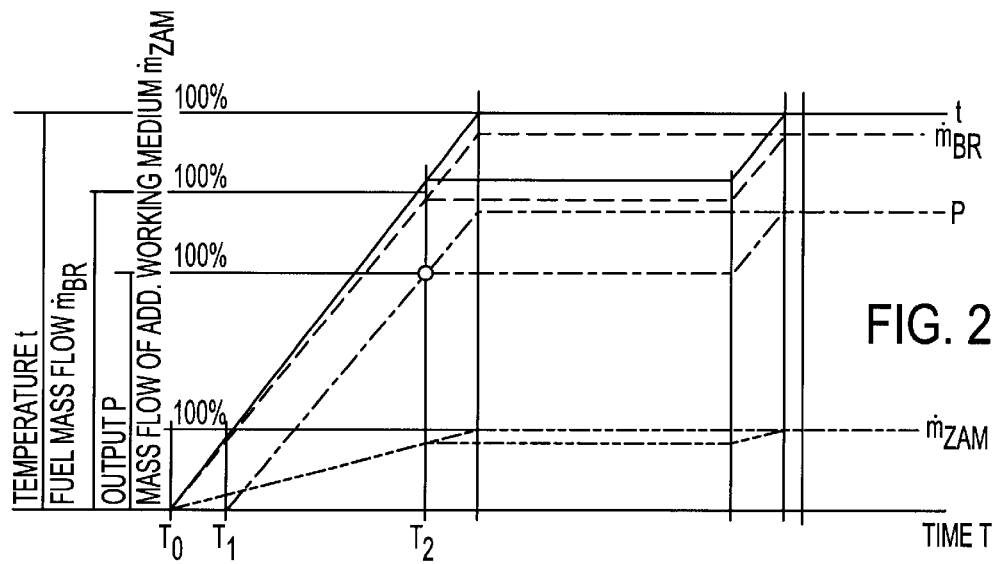
FIG. 2 is a graph, corresponding to that of FIG. 1, in which the profile of these parameters is illustrated according to a first embodiment of the invention.
Figure 3:
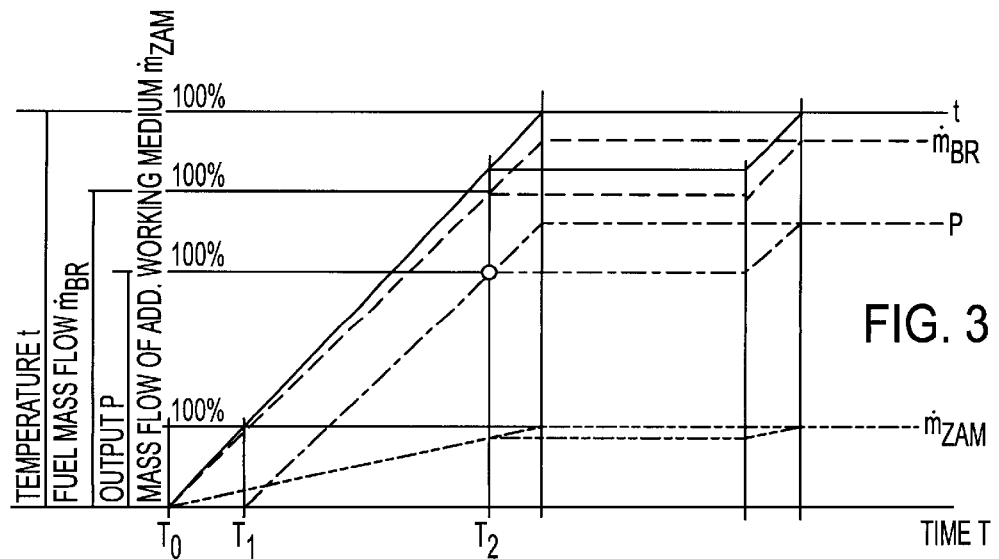
FIG. 3 is a graph, corresponding to that of FIG. 1, in which the profile of these parameters is illustrated according to a second embodiment of the invention.

In FIGS. 1 to 3, the parameters essential to the concept of the invention are indicated in % on the y-axis. The time T is plotted on the x-axis.

In order to make the explanations simpler, unsteady-state processes, that is to say the operations of starting up and of increasing the output which are essential to the invention, are based on a linear dependence of the parameters of the gas turbine plant on time or on constant parameter gradients and a proportional dependence of these parameters. The complex and nonlinear dependence of these parameters which is to be encountered in practice is, however, unimportant for the concept of the invention.

It is assumed, furthermore, that the startup of the gas turbine plant takes place with ignition at the time point $T_0$. After a particular time $T_1$, the rated speed of the gas turbine plant is reached at a specific temperature. Network synchronization has been carried out simultaneously, and the output of power commences.

As to the definition of the parameters illustrated hereafter, it may be noted that the temperature t is a parameter critical to the system for reasons of different expansions of the components of the gas turbine plant, because of stresses caused by temperature gradients, and due to a variation in the material properties and the like in specific operating states and during transient events. This is expressed in a maximum permissible temperature and a maximum permissible temperature gradient. Since these temperature requirements depend on the design features, parameters, materials, etc. of the actual gas turbine plant, only a temperature or a temperature gradient will be referred to hereafter.

The output P characterizes the power output of the gas turbine plant to the shaft. The fuel and the additional working medium are characterized by mass flows $\dot{m}_{BR}$ (fuel mass flow) and $\dot{m}_{ZAM}$ (mass flow of the additional working medium).

FIG. 1, then, illustrates a normal startup operation. The continuous increase in the fuel supply, and consequently the heating up of the system, commences with the ignition of the burners at the time point $T_0$.

Without dealing in more detail hereafter with the relationship between the fuel mass flow and the air mass flow, in the case of changes in the fuel mass flow, depending on the respective gas turbine plant, the following explanations also assume corresponding adaptions of the air mass flow.

The rated speed is reached at the time point $T_1$, and power output commences. The parameters of the maximum continuous output are reached correspondingly at the time point $T_2$.

This startup operation has been carried out with the maximum permissible temperature gradient for the system. With the maximum continuous output being reached, the maximum permissible temperature for the system has also been reached.

Either directly afterward or at a later time, with the constant maximum permissible temperature being maintained, the output may be increased further to the maximum output by the injection of an additional working medium, along with the simultaneous increase in the supply of the fuel mass flow.

Reference is made, then, to FIG. 2. According to a first concept of the invention, during startup not only are fuel and combustion air supplied increasingly to the gas turbine plant, commencing at the time point $T_0$, but, at the same time, an additional working medium, for example cold water, warm water, hot water, saturated water, wet steam, saturated steam or superheated steam, which increases the mass flow.

If the maximum permissible temperature gradient is unchanged, then, by the simultaneous supply of an additional working medium the fuel supply, and consequently the output, can be increased, as compared with the startup operation illustrated in FIG. 1. This leads, as a result, to an earlier power output, but, in particular, to a higher output gradient. The maximum continuous output, then, is operated at a lower temperature. The maximum permissible temperature is reached only when the maximum output is reached.

There can be a run up to the maximum continuous output or directly to the maximum output in a similar way to the operation described in FIG. 1.

According to a further version shown in FIG. 3, the gas turbine plant may be started up with the output gradient corresponding to that of FIG. 1, but with a lower temperature gradient, that is to say in a way which takes greater care of the plant. This startup operation, likewise with an injection of an additional working medium starting at the time point $T_0$, is regulated according to the output gradient of the startup operation according to FIG. 1, said output gradient being obtained for the maximum permissible temperature gradient without additional working medium, or according to an output gradient which is lower to any desired extent.

As compared with a startup operation with a maximum temperature gradient without additional working medium, then, a lower temperature or a lower temperature gradient is achieved, whilst the output or output gradient remains comparable.

As regards FIGS. 1 to 3 or the startup operations described, it may be noted that, by means of these operations, it is possible to run up to any desired output between 0 and the maximum output. The individual operating modes may also commence at any desired actual outputs. In "primary response" terms, in particular, the operating mode described in FIG. 2, with a maximum output gradient from any operating state, must be capable of being implemented.

The operating modes illustrated in FIGS. 1 to 3 and described above may, of course, also be applied in combination. Thus, for example, it may be that, during a normal startup operation taking place according to FIG. 1 or after a startup operation taking place according to FIG. 3 and taking greater care of the plant, the plant is called up on the network side in order to perform frequency-assisting tasks. In this case, there would be a change to the operating mode according to FIG. 2 with a maximum possible output gradient.

The operating modes described may, of course, also be employed in the opposite direction, that is to say in order to shut down the gas turbine plant rapidly or in a way taking greater care of the plant.

FIGS. 4 to 7 show various plants for carrying out the method.

FIG. 4 shows, in simplified form, a gas turbine plant 1 which contains a compressed-air source 2, a combustion chamber 3 and a turbine 4. The compressed-air source 2 may be a compressor, but may also, for example, be compressed air stored in a cave. The fuel is supplied to the combustion chamber 3 through the fuel line 6 and the additional working medium, that is to say water or steam, is supplied through the working medium line 7. In this version, the fuel and the additional working medium are led separately into the combustion chamber 3 and are intermixed only when they are in the combustion chamber 3.

The combustion chamber, as the injection point for the additional working medium, must be understood merely as an example in the figures and in the explanations. It has already been pointed out, in the foregoing explanations, that, for the supply of the additional working medium, the region between the compressor outlet and the turbine is relevant, depending on the design features of the gas turbine plant.

According to the version shown in FIG. 5, the fuel flowing in through the fuel line 6 and the additional working medium flowing in through the working medium line 7 are intermixed in a mixing device 8 and are supplied as a mixture to the combustion chamber 3 via the mixture line 10.

FIG. 6 shows a gas turbine plant, here the compressed-air source 2 being a compressor and the turbine 4 serving as a drive, for example of a compressor 9 for compressing a gas or of a pump for conveying a medium. There could obviously also be a generator here. The fuel line 6 has a regulating member 11 and the working medium line 7 a further regulating member 12. The regulating members 11 and 12 are controlled by a regulator 13. Such a regulator 13 is also present in the versions according to FIGS. 4, 5 and 7.

The regulator 13 has stored in it, for example, the outputs/output gradients operable at specific temperatures/temperature gradients or the mass flows/mass flow gradients belonging to specific operating modes, for fuel and additional working medium, together with the corresponding limit values for the system.

The regulator 13 may also determine the necessary parameters for each transient state as a function of the state point, in accordance with the actual properties of the fuel and additional working medium.

The regulating member 11 and the further regulating member 12 are controlled by the regulator 13 as a function of a predetermined startup program. In this case, the mass flows are controlled in such a way that the value of the maximum permissible positive temperature gradient or of the maximum permissible positive output gradient of the gas turbine plant is not exceeded under any circumstances, depending on whether an increase in output which is as rapid as possible or takes as great a care of the plant as possible is to be carried out.

In order to increase the accuracy of the operations during startup and during load changes, the mass flows $\dot{m}_{BR}$ and $\dot{m}_{ZAM}$ in the fuel line 6 and in the working medium line 7, the power output P of the shaft and the temperature t representative of the gas turbine plant 1 may be measured and applied to the regulator 13 in order to correct the mass flows in the lines via the regulating members 11 and 12.

FIG. 7 shows a combined-cycle power station with a gas turbine plant 1, including a compressor 2, a combustion chamber 3, a turbine 4 and a generator 5.

The heat recovery steam generator 14 designed, for example, as a drum boiler contains an economizer 15, an evaporator 16 together with the drum 17, and a superheater 18. The steam generated in the heat recovery steam generator 14 is supplied to a condensing steam turbine 19 which is connected to a generator 20.

The condenser 21 and the feed-water pump 22 of the water/steam circuit of the combined-cycle plant are also illustrated.

It was stated at the outset that the additional working medium for increasing the mass flow through the turbine may be cold water, warm water, hot water, saturated water, wet steam, saturated steam or superheated steam. This additional working medium is supplied to the combustion chamber 3 via the working medium line 7. Depending on whether the additional working medium is water or steam in one of the abovementioned states, it can be extracted from a suitable point in the water/steam circuit of the combined-cycle plant, as indicated by the source point 23.

| List of reference symbols | |
|---|---|
| T | Time (x-axis) |
| $T_0$ | Ignition time point |
| $T_1$ | Synchronization time point |
| $T_2$ | Time point when maximum continuous output is reached |
| T | Temperature |
| P | Output |
| $\dot{m}_{ZAM}$ | Mass flow of the additional working medium |
| $\dot{m}_{BR}$ | Mass flow of the fuel |
| 1 | Gas turbine plant |
| 2 | Compressed-air source/compressor |
| 3 | Combustion chamber |
| 4 | Turbine |
| 5 | Generator |
| 6 | Fuel line |
| 7 | Working medium line |
| 8 | Mixing device |
| 9 | Apparatus (compressor, pump) |
| 10 | Mixture line |
| 11 | Regulating member for fuel |
| 12 | Further regulating member for additional working medium |
| 13 | Regulator |
| 14 | Heat recovery steam generator |
| 15 | Economizer |
| 16 | Evaporator |
| 17 | Drum |
| 18 | Superheater |
| 19 | Condensing steam turbine |
| 20 | Generator |
| 21 | Condenser |
| 22 | Feed-water pump |
| 23 | Source point |

What is claimed is:

1. An apparatus comprising:

a compressed-air source, a combustion chamber and a turbine, said turbine having an inherent maximum permissible positive temperature gradient dependent upon design features of the turbine, a fuel line for supplying a fuel to the combustion chamber, a working medium line for supplying an additional working medium selected from at least one of cold water, warm water, hot water, saturated water, wet steam, saturated steam or superheated steam to the turbine, and a regulator for controlling respective mass flows through the fuel line and the working medium line as a function of a stored value of the maximum permissible positive temperature gradient of the turbine such that the maximum permissible positive temperature gradient is not exceeded during operation of the turbine.

2. The apparatus as claimed in claim 1, wherein the regulator is designed to control the mass flow of the additional working medium supplied and the fuel mass flow supplied, so that the startup and the increase in output of the gas turbine plant take place with a maximum output gradient.

3. The apparatus as claimed in claim 1, wherein the regulator is designed to control the mass flow of the additional working medium supplied and the fuel mass flow supplied, so that the startup and increase in output of the gas turbine plant take place with the lowest possible temperature gradient.

4. The apparatus as claimed in claim 1, further comprising a mixing device, to which the fuel line and the working medium line lead and from which a mixture line for the mixture having fuel and additional working medium runs to the gas turbine plant.

5. A combined-cycle power station having a gas turbine plant, wherein said gas turbine plant includes a compressed-air source, a combustion chamber and a turbine, said turbine having an inherent maximum permissible positive temperature gradient, a fuel line for supplying a fuel to the combustion chamber, a working medium line for supplying an additional working medium selected from at least one of cold water, warm water, hot water, saturated water, wet steam, saturated steam or superheated steam to the turbine, and a regulator for controlling respective mass flows through the fuel line and the working medium line as a function of a stored value of the maximum permissible positive temperature gradient of the turbine such that the maximum permissible positive temperature gradient is not exceeded during operation of the turbine, and said combined-cycle power station further including a generator and a heat recovery steam generator heated by waste gas from the turbine and a steam turbo set, wherein the additional working medium is extracted from the water/steam circuit of the combined-cycle power station.

* * * * *